United States Patent [19]

Sieben

[11] 4,288,048

[45] Sep. 8, 1981

[54] CASSETTE

[75] Inventor: Joannus H. F. C. Sieben, Eindhoven, Netherlands

[73] Assignee: U.S. Philips Corporation, New York, N.Y.

[21] Appl. No.: 121,338

[22] Filed: Feb. 14, 1980

[30] Foreign Application Priority Data

Mar. 6, 1979 [AT] Austria .................................. 1694/79

[51] Int. Cl.³ .......................... G03B 1/04; G11B 15/32
[52] U.S. Cl. ..................................... 242/198; 242/204
[58] Field of Search ........ 242/55.19 A, 194, 197–200, 242/204; 360/96, 132; 352/72–78

[56] References Cited

U.S. PATENT DOCUMENTS

| | | | |
|---|---|---|---|
| 2,584,733 | 2/1952 | Owens | 242/198 |
| 2,732,754 | 1/1956 | Foster et al. | 242/198 |
| 3,059,871 | 10/1962 | Loewe | 242/198 |
| 3,087,686 | 4/1963 | Wren | 242/198 |
| 3,146,316 | 8/1964 | Knoth | 360/132 |
| 3,227,387 | 1/1966 | Laa et al. | 242/198 |
| 3,497,157 | 2/1970 | Hanes et al. | 242/188 |
| 4,029,268 | 6/1977 | Schoettle et al. | 242/198 |
| 4,106,724 | 8/1978 | Higashida | 242/198 |

Primary Examiner—Leonard D. Christian
Attorney, Agent, or Firm—David R. Treacy

[57] ABSTRACT

A magnetic tape cassette having two tape winding reels with associated brake levers pivotable between a disengaged position and a braking position for rotating the reels slightly and tensioning the tape when the cassette is not on a tape apparatus. To obtain a maximum rotation of the winding reels within the available cassette space, the levers are each journalled on a lever mount which can be actuated from outside the cassette to move from a rest position to an operating position in which the brake levers are disengaged, in the rest position the levers engaging at least one control surface in the cassette.

5 Claims, 5 Drawing Figures

CASSETTE

BACKGROUND OF THE INVENTION

The invention relates to a cassette for a record carrier in the form of a tape, having two rotatable winding reels for taking up and unwinding the record carrier, and a spring-loaded brake lever for each of the winding reels, which lever is movable between a disengaged position, in which the brake lever is disengaged from the associated winding reel, and a braking position, in which the brake lever cooperates with the associated winding reel so as to brake said reel, the brake lever rotating the associated winding reel through a limited angle in a winding direction. A magnetic tape cassette of this type is known from U.S. Pat. No. 4,022,401.

In the known magnetic tape cassette the two brake levers are pivotably journalled on bearing pins which are rigidly mounted on two walls of the cassette, and the two brake levers each have a resilient hook at one of their ends, arranged to engage a toothed ring on the associated winding reel. The hooks are resilient so that as they engage the teeth when the two brake levers pivot to their braking positions, the two winding reels are slightly rotated in their winding directions as a result, after a cassette has been used any slackness in a span of the magnetic tape between the two rolls contained on the winding reels is eliminated, and the span extending between the two winding reels in the cassette is kept free from backlash and is taut under the influence of a comparatively small tensile force. This is essential for a correct operation of the cassette, because if the magnetic tape in the cassette is not taut, the tape is likely to be damaged when the cassette is placed on or is removed from a magnetic tape apparatus.

Because the two brake levers are journalled on fixed pins and the space inside the cassette is limited in order to accommodate a maximum amount of magnetic tape, the lever arms of the brake lever also have limited dimensions, and the travel of the resilient hooks of the brake levers is limited. Consequently, only comparatively small rotary movements of the two winding reels are possible, so that in the known cassette only a slight degree of slackness of the magnetic tape can be eliminated. Thus, with the known cassette it is not always ensured that the magnetic tape is taut under all conditions.

SUMMARY OF THE INVENTION

It is the object of the invention to provide a simple, inexpensive and reliable braking lever arrangement which can correct for a relatively large amount of slack in the tape.

In accordance with the invention, a tape cassette includes a lever mount for the two brake levers, movable between a rest position and an operating position, the lever mount position being controlled from outside the cassette. The two brake levers are each journalled on the mount so as to be between their braking positions and their disengaged positions. The cassette also includes at least one control surface for the brake levers, arranged so that during the movement of the lever mount from its rest position to its operating position, the control surface engages the two brake levers which are pivotably journalled on the lever mount, so as to pivot the levers to their disengaged positions. Because the brake levers are mounted on a movable mount, in spite of the limited space in the cassette it is possible to obtain a comparatively large travel for the brake levers and thus a comparatively large rotation of the winding reels.

When the lever mount is moved to its operating position, the two brake levers are pivoted to their disengaged positions. When the lever mount is moved from the operating position to the rest position, the brake levers automatically return from their disengaged positions to their braking positions, thus making possible a comparatively large rotation of the winding reels during the movement of the lever mount. The magnitude of the rotary movements imparted to the winding reels by the brake levers then depends not only on the travel of the lever mount but also on the construction of the control surfaces for the two brake levers. By a suitable choice of the construction of these components, in accordance with the invention a comparatively large adequate rotary movement can always be imparted to the two winding reels upon engagement of the brake levers, ensuring that even a comparatively high degree of slackness of the record carrier is eliminated simply and with adequate tensioning. This cassette, in accordance with the invention, has the advantage that elimination of slackness and adequate tensioning of the record carrier are obtained by simple means.

As control surfaces for the two brake levers it is for example possible to employ oblique surfaces on walls of the cassette, which cooperate with projections of the brake levers. It is found to be advantageous when the control surface for each brake lever is associated with a stop, which the brake lever engages when the lever mount moves from its rest position to its operating position. This provides a robust, troublefree and reliable construction. Such a stop for a brake lever may for example be constituted by a pin which projects from a wall of the cassette. In an alternative preferred embodiment the stop for each brake lever comprises a portion of a wall of the cassette. This yields a simple and compact construction, because no special stop means are necessary.

After placing the cassette on a suitable apparatus the lever mount may for example be moved with the aid of an actuating mechanism provided on the apparatus, which mechanism moves the lever mount from the rest position to the operating position so as to disengage the brake levers and which moves the lever mount from the operating position to the rest position so as to bring the brake levers back into their braking positions. However, it is found to be advantageous when at least one resilient means such as an actuating spring in the cassette urges the lever mount towards its rest position. This ensures that the lever mount, which is moved to the operating position and retained in this position when a cassette is placed on the apparatus, automatically returns from its operating position to its rest position under the influence of the actuating spring upon removal of the cassette from the apparatus, the brake levers then assuming their braking positions. Thus, it is automatically ensured that when a cassette in accordance with the invention is removed from an apparatus the winding reels are braked by the brake levers.

The actuating spring and a resilient means for actuating the brake levers, such as the brake spring, may be constituted by separate springs of a different type, and for example may be constituted by elastic projections on the lever mount or on the brake levers themselves. However, it may be advantageous when the actuating spring for the lever mount and each brake spring for a brake lever together belong to an integral multi-arm leaf spring which is mounted in the cassette, whose arms engage the lever mount and the brake levers. The actuating spring for the lever mount as well as the brake springs for the brake levers are then constituted by a single spring, which is advantageous in view of simplicity of mounting and the small space required.

The invention is described in more detail with reference to the drawing which shows two embodiments, to which the invention is not limited.

DESCRIPTION OF THE PREFERRED EMBODIMENTS

Figure 1:
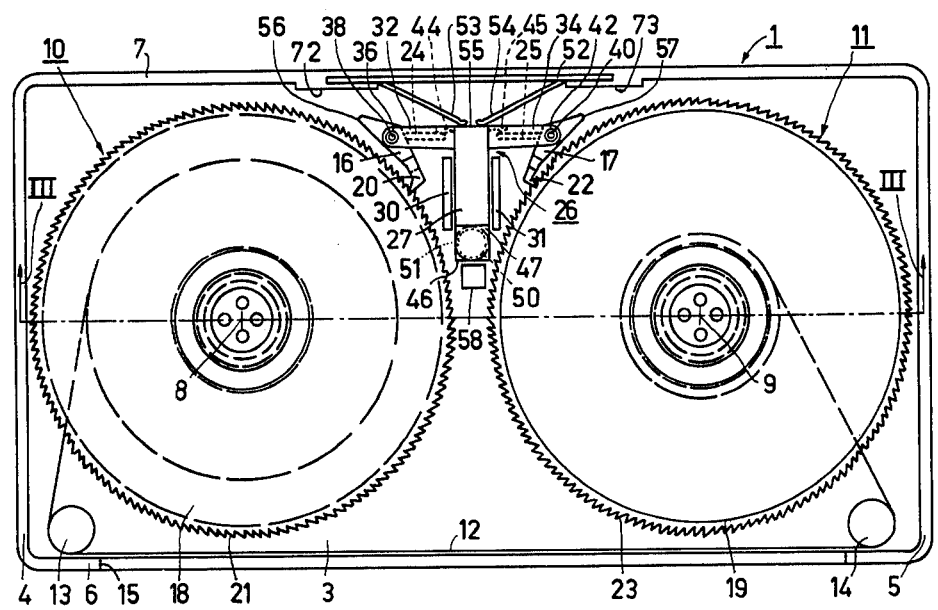
FIG. 1 is a plan view of a cassette with one cassette housing-half removed, a control surface for two brake levers, which are shown in the braking position, being constituted by a side wall of the cassette.
Figure 2:
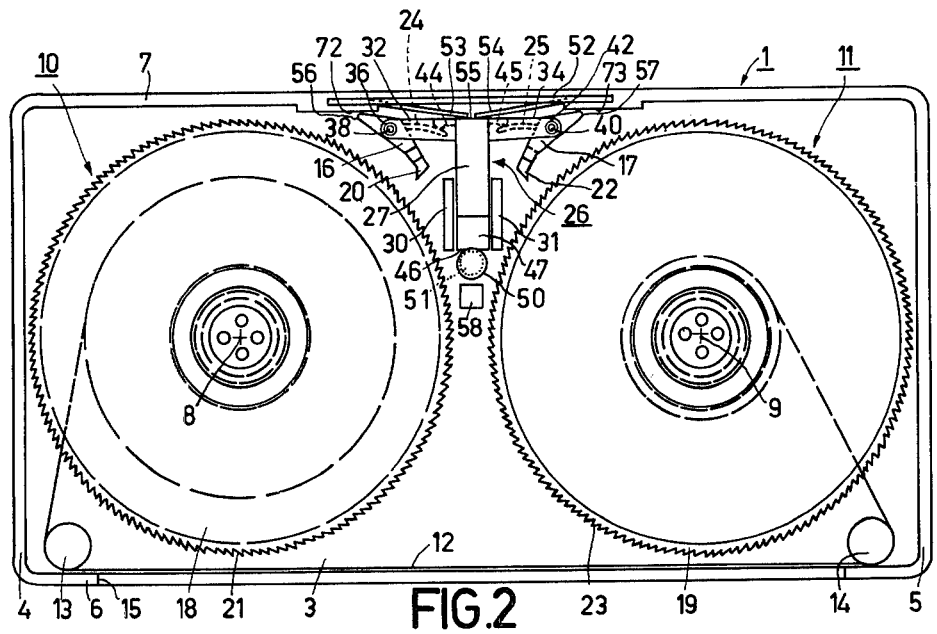
FIG. 2 shows the cassette of FIG. 1 in plan view with one cassette housing-half removed, the brake levers now being in their disengaged positions.
Figure 3:
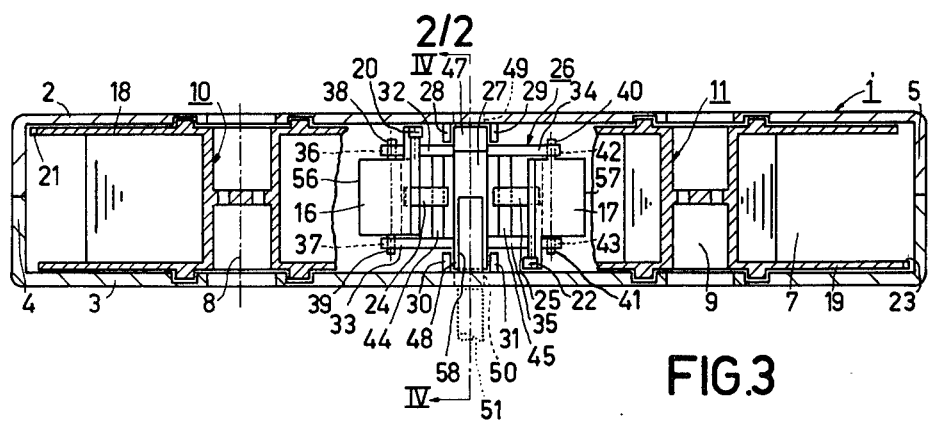
FIG. 3 shows a cross-sectional view of the cassette of FIG. 1 taken on the line III—III in FIG. 1.

FIGS. 1 through 3 show a cassette 1, which comprises two box-shaped cassette housing-halves and major walls 2 and 3, side walls 4 and 5, a front wall 6 and a rear wall 7. The cassette contains two winding reels 10 and 11, which are rotatable about symbolically represented axes of rotation 8 and 9, for taking up and unwinding a magnetic tape 12 accommodated in the cassette 1. The magnetic tape 12 is passed between the two winding reels 10 and 11 over two guide pins 13 and 14, which guide the magnetic tape along the front wall 6 of the cassette. In the front wall 6 an opening 15 is formed, through which opening the magnetic tape contained in the cassette can be pulled out of the cassette so as to cooperate with guide and scanning elements on a magnetic tape apparatus during operation. Alternatively it would be possible to pass guide and scanning elements for the magnetic tape into the cassette through the opening 15 in the front wall 6 for cooperation with the magnetic tape which then remains in the cassette, during operation.

During operation the magnetic tape is passed, in known manner, from the one winding reel to a roll on the other winding reel in the cassette. During the transport of the magnetic tape the tape is scanned by one or more stationary or moving scanning elements, depending on the type of magnetic tape apparatus, in order to play back a recording made on the magnetic tape or in order to make such a recording. When after use, during which transport of the record carrier has taken place, the cassette is removed from an apparatus, care must be taken that the magnetic tape is not slack, because this may cause looping. Expressed another way, the magnetic tape must be kept sufficiently taut between the two winding reels.

For this purpose the cassette is provided with the two brake levers 16 and 17 associated with the winding reels 10 and 11, which levers are movable between a disengaged position, in which the brake levers 16 and 17 are disengaged from the associated winding reels 10 and 11 respectively, and a braking position, in which the brake levers brake the associated winding reels. FIG. 1 shows the brake levers 16 and 17 in the braking positions and FIG. 2 in the disengaged positions.

To permit simple construction each of the two brake levers 16 and 17 cooperates with only one reel flange 18 or 19 of the associated reel 10 and 11 respectively, which two reel flanges 18 and 19, viewed in the axial direction of the winding reel, are disposed on opposite ends of their respective reels. In the braking position a hook-shaped free end 20 of the brake lever 16 engages sawtooth-shaped teeth 21 arranged in a ring about the reel flange 18 of the winding reel 10, this flange being situated near the major wall 2. Similarly, a hook-shaped free end 22 of the brake lever 17 engages a ring of sawtooth-shaped teeth 23 of the reel flange 19 of the winding reel 11, the flange 19 being situated near the major wall 3. The hook-shaped free end 22 is offset in the direction of the major wall 3, while the free end 20 is similarly offset in the direction of the major wall 2. The teeth 21 and 23 of the reel flanges 18 and 19 are constructed so that the hook-shaped ends 20 and 21 of the brake levers 16 and 17 can slide over the oblique edges of the teeth without exerting a torque on the winding reels which is sufficient to rotate them in the unwinding direction. The brake levers engage behind the radially extending edges of the teeth and are thus capable of rotating the winding reels in the winding direction. Obviously, each brake lever could be provided with a brake on its free end, which pad is for example made of rubber, foam plastics or a similar material with a high coefficient of friction, for cooperation with a reel flange which is not provided with teeth and which is thus smooth on its circumference. Alternatively, each brake lever may cooperate with the two reel flanges of a winding reel or with a separate brake drum which is coaxially connected to a winding reel and which may be provided with teeth.

A brake spring 24 or 25, which is constituted by a resilient tongue connected to the brake levers 16 and 17 respectively, acts on each of the brake levers 16 and 17. The brake springs 24 and 25 tend to move the brake levers 16 and 17 from their disengaged positions to their braking positions. When they are moved to the braking positions the brake levers, as is explained in more detail hereinafter, rotate the two reels 10 and 11 in the winding direction.

As is shown in FIGS. 1 to 3, a substantially T-shaped lever mount 26 for the two brake levers 16 and 17 is provided in the cassette near the rear wall 7. The lever mount 26 includes a basic portion 27, which is arranged between two ridges 28, 29 and 30, 31 which respectively project from the two major walls 2 and 3 and which extend perpendicularly to the rear wall 7. In this way the lever mount 26 is movably guided in the cassette. The lever mount, as is to be explained hereinafter, is movable between a rest position, shown in FIG. 1, in which the the brake levers are in their braking positions, and an operating position, shown in FIG. 2, in which the braking levers are in their disengaged positions.

The lever mount 26 has two arms 32, 33 and 34, 35 which respectively extend from the basic portion 27 in opposite directions, substantially parallel to the rear wall 7 of the cassette 1. The two arms 32 and 33 have coaxial bores 36 and 37 near their free ends, through which bores journals 38 and 39 provided on the brake lever 16 extend respectively. In this way the brake lever 16 is pivotably journalled on the lever mount 26. In a similar way the second brake lever 17 is pivotably journalled by means of journals 40 and 41 in coaxial bores 42 and 43 near the free ends of the two other arms 34 and 35 of the lever mount 26. Between the two arms 32 and 33, adjacent the basic portion 27, there is provided a connecting portion 44, against which the free end of the resilient tongue 24, which functions as the brake spring for the brake lever 16, bears under pre-tension (prestress). In a similar way the free end of the tongue 25, which functions as brake spring for the brake lever 17, is prestressed to bear against a connecting portion 45 provided between the two arms 34 and 35 adjacent the basic portion 27. Thus, the two pre-tensioned resilient tongues 24 and 25 resiliently urge the two brake levers 16 and 17 to their braking positions.

Figure 4:
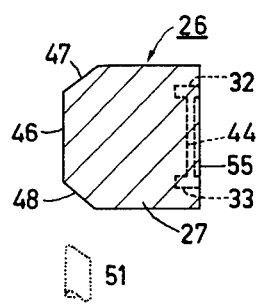
FIG. 4 is a cross-sectional view of a lever mount for the brake levers of the cassette of FIGS. 1 to 3 taken on the line IV—IV in FIG. 3.

The lever mount 26 is moved from the rest position to the operating position from outside the cassette. On its end 46 which is remote from the rear wall 7 of the cassette, the basic portion 27 of the lever mount 26, as is apparent in particular from FIG. 4, has two actuating surfaces 47 and 48, which extend obliquely relative to the direction of movement of the mount 26. Each of the two actuating surfaces 47 and 48 is disposed near one of the two major walls 2 and 3 of the cassette and is accessible for an actuating element of a cassette apparatus through an opening 49 and 50 in the major walls 2 and 3 respectively. The actuating element may for example be constituted by an actuating pin 51, which is symbolically represented by dotted lines in FIGS. 1 to 4. When the cassette is inserted in the apparatus, depending on the position of the cassette, the pin is inserted through one of the two openings 49 and 50 in the cassette and then engages one of the two oblique actuating surfaces 47 and 48. As soon as the actuating pin 51 engages an actuating surface 47 or 48, the lever mount 26 is moved from the rest position to the operating position.

The lever mount 26 is moved from the rest position to the operating position against the action of an actuating spring 52, which acts on the basic portion 27. This actuating spring is constituted by a two-arm leaf spring, which bears against the rear wall 7 of the cassette, whose two spring arms 53 and 54 bear with pre-tension against the end 55 of the basic portion 27 of the lever mount 26, which end faces the rear wall 7. The actuating spring 52 urges the lever mount from the operating position to the rest position. As soon as the actuating pin 51, which cooperates with the lever mount, is withdrawn from the cassette, the actuating spring 52 automatically moves the lever mount 26 from the operating position to the rest position.

In order to pivot the two brake levers which are pivotably journalled on the lever mount, from their braking positions to their disengaged positions when the lever mount is moved from its rest position to its operating position, there is provided a control surface in the cassette for each of the two brake levers 16 and 17. These control surfaces include stops with which the brake levers engage during their pivotal movement. In the embodiment shown these brake-lever stops are formed by portions 72 and 73 of the rear wall 7 of the cassette. However, it is obvious that for each brake lever a separate stop pin or the like, which is connected to at least one of the two major walls, may be used.

When the actuating pin 51 enters the cassette through one of the openings 49 or 50 and engages one of the oblique actuating surfaces 47 and 48 respectively, the lever mount is moved from its rest position towards the rear wall 7 of the cassette, against the action of the actuating spring 52. During this movement the two brake levers 16 and 17, which are pivotably journalled on the mount, are moved along, first sliding with their hook-shaped ends 20 and 22 over the oblique edges of the toothings 21 and 23 on the two winding reels 10 and 11 under the influence of the brake springs 24 and 25, without rotating the reels in the unwinding direction. After a certain travel of the lever mount 26 the two brake levers 16 and 17 engage the rear wall at the location of the stops 72 and 73 with their ends 56 and 57, which face the rear wall 7, so that the brake levers can no longer follow a further movement of the lever mount 26. Upon a further movement of the lever mount 26 towards the rear wall 7, the two brake levers, because they are now urged against the stops 72 and 73 with their ends 56 and 57 under the influence of the brake springs 24 and 25 and their pivoting axes 38, 39 and 40, 41 move along with the lever mount, are pivoted against the action of the brake springs 24 and 25 in such a way that the levers are disengaged from the winding reels 10 and 11. Finally, the lever mount 26 reaches its operating position, as shown in FIG. 2, when the actuating pin 51 engages with the end 46 of the lever mount which is remote from the rear wall 7, the actuating spring 52 urging the lever mount against the actuating element 51. The brake levers 16 and 17 are then in their disengaged positions shown in FIG. 2.

When the brake levers are disengaged from the winding reels, these reels can rotate freely. Thus, transport of the magnetic tape from the one winding reel to the other winding reel is possible, the magnetic tape being unwound from the one winding reel to a role on the other winding reel. After a cassette has been used it frequently occurs that the magnetic tape between the two reels is no longer sufficiently taut. This may for example be caused by frequent interruptions during use or by the braking devices of a cassette apparatus not providing the correct braking action for the two reels or by similar influences. However, when the magnetic tape between the two reels is not kept sufficiently taut, this may lead to an undesirable degree of slackness of the magnetic tape and thus to looping. During subsequent use of the cassette this may give rise to incorrect operation and to damage or breakage of the magnetic tape.

For this reason it is found to be effective when the brake levers in a cassette rotate the two winding reels sufficiently far when they move from their disengaged positions to the braking positions, because in that case the brake levers will eliminate any slackness of the magnetic tape span in the cassette. In a cassette in accordance with the invention this is achieved in a particularly simple, robust and reliable manner, as will appear from the following description.

When the lever mount 26 is in the operating position and the actuating pin 51, which cooperates with the end 46 of said mount, is withdrawn from the cassette, for example because the cassette is removed from a cassette apparatus, the lever mount 26 is moved out of its operating position away from the rear wall 7 under the influence of the actuating spring 52. The pivoting axes 38, 39 and 40, 41 of the two brake levers 16 and 17, which bear against the rear wall 7 with their ends 56 and 57 under the influence of the brake springs 24 and 25, are then also moved away from the stops 72 and 73 on the rear wall 7. In this way the brake levers will pivot under the influence of the brake springs 24 and 25, the hook-shaped ends 20 and 22 of the brake levers engaging the radially extending edges of the rings of teeth 21 and 23 on the reel flanges 18 and 19 of the winding reels 10 and 11. Upon a further movement of the lever mount 26 under the influence of the actuating spring 52 the ends 56 and 57 of the brake levers 16 and 17 are disengaged from the stops 72 and 73 on the rear wall 7 and the brake levers 16 and 17, which already engage with the radially extending edges of the teeth 21 and 23 of the winding reels 10 and 11, are moved along with the mount. The brake levers which are thus movable in the winding direction relative to the winding reels and which engage with the radially extending edges of the teeth can then produce a comparatively large rotation of the two winding reels, so that the magnetic tape is wound onto the two winding reels and thus tensioned. The degree of rotation of the winding reels is determined by the distance over which the lever mount is moved after the brake levers become disengaged from the stops 72 and 73 constituted by the rear wall 7. As soon as the magnetic tape is sufficiently taut, the two winding reels can no longer be rotated further in the winding direction, so that they are stopped. The brake levers can neither be moved any further, so that the lever mount is no longer moved further by the actuating spring. Thus, the rest position of the lever mount and the braking position of the brake levers, which corresponds thereto, is defined by the amount of slack which had existed in the span of magnetic tape which is tensioned. The tension in the magnetic tape is determined by the force of the actuating spring which acts on the lever mount. Thus, under normal circumstances the magnetic tape will always be tensioned when the cassette is not used.

As is shown in FIG. 1, in the rest position shown, the end 46 of the lever mount 26, which end is remote from the rear wall 7 of the cassette, is disposed at a small distance from a connecting element 58 which is connected to the major wall 3 of the cassette. Said connecting element may serve as a stop for the lever mount 26 and limits the attainable travel of the actuating spring 52. This is for the exceptional case that, for example when a user drops the cassette and a comparatively large amount of magnetic tape is unwound, the magnetic tape cannot be tensioned by a single movement of the lever mount from its operating position to its rest position. In that case the rest position of the lever mount is not determined by the tensioned span of magnetic tape but by the connecting element 58. This ensures that the actuating surfaces 47 and 48 of the lever mount are always accessible for an actuating element such as the actuating pin 51 through the openings 49 and 50 formed in the major walls 2 and 3 of the cassette. If the connecting element 58 were not provided, the lever mount could be moved too far by the actuating spring in said exceptional cases, preventing the actuating element from penetrating into the interior of the cassette. When a single movement of the lever mount from its operating position to its rest position and the associated movement of the brake levers does not suffice to tension the magnetic tape, this may be achieved by moving the lever mount several times to an fro. The hook-shaped ends of the brake levers then alternately slide over the oblique edges of the teeth on the winding reels without rotating the winding reels in the winding direction and subsequently engage the radially extending edges of the teeth, thus rotating the winding reels in the winding direction. This process has already been described for a single to-and-fro movement of the lever mount.

As is evident from the foregoing description, these simple means ensure that under normal circumstances the magnetic tape can still be tensioned in a simple, reliable and effective manner, even if a magnetic tape has a comparatively large loop. Since the lever mount is resiliently loaded by the actuating spring, the lever mount is automatically moved from its operating position to its rest position, so that the brake levers are always automatically set to their braking positions. The use of the rear wall of the cassette as a control surface for the two brake levers obviates the use of additional, separate elements, which permits a more simple and compact construction.

Figure 5:
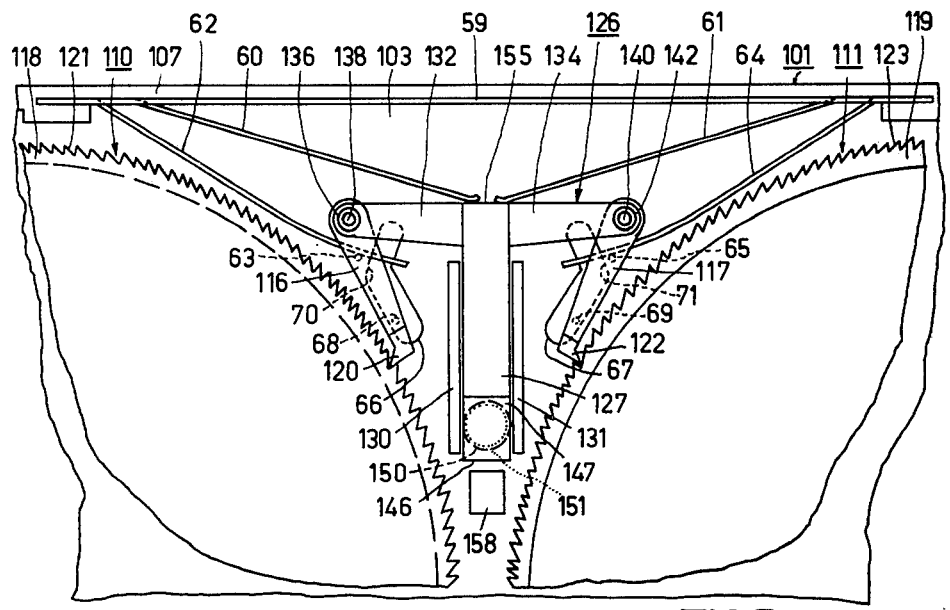
FIG. 5 shows a second embodiment of a cassette in accordance with the invention in plan view with one cassette housing-half removed, control surfaces for the two brake levers being provided which comprise the sides of two oblique control slots in a wall of the cassette.

In the embodiment of FIG. 5 an integral four-arm leaf spring 59 is arranged on the rear wall 107 of the cassette, this spring serving as the actuating spring for a lever mount 126 and the braking spring for each of the two brake levers 116 and 117. Two prestressed arms 60 and 61 of the leaf spring engage the end 155 of the lever mount 126 which faces the rear wall 107. A third arm 62 of the leaf spring 59 engages pin-shaped projection 63 on the brake lever 116 and a fourth arm 64 engages a pin-shaped projection 65 of the brake lever 117 each of these arms also being prestressed to provide a biasing force against the respective brake lever. The two arms 62 and 64 of the leaf spring 59 then act as brake springs for the two brake levers 116 and 117, urge the brake levers toward their braking positions.

As control surfaces for the two brake levers 116 and 117 two arcuate control slots 66 and 67 are formed in a major wall 103 of the cassette. Respective pin-shaped projections 68 and 69 on the brake levers 116 and 117, engage and slide along bounding surfaces 70 and 71 of the two control slots 66 and 67 to cause the two brake levers to pivot upon a movement of the lever mount 126.

The operation of the brakes of the cassette of FIG. 5 is identical to that of the brakes in the embodiment of FIGS. 1 to 4.

The use of a single leaf spring, which performs several functions, may be advantageous in view of the space that is available and simplicity of assembly. Depending on the shape of the bounding surfaces which cooperate with the pin-shaped projections of the brake levers, any desired and effective cycle of movements for the brake levers can be realized with the aid of the control slots.

It is obvious that several variants are possible within the scope of the invention, for example in respect of the construction of the lever mount and of the brake springs and the actuating spring. For example, helical springs may be used intead of leaf springs. The lever mount for the two brake levers need not be mounted so as to be slidable in the cassette, but may also be pivotably journalled in the cassette. It is evident that the brakes in accordance with the invention may also be employed in cassettes which contain two winding reels which are arranged coaxially above one another, or in cassettes in which two adjacent winding reels are rotated in the same direction of rotation when the record carrier is wound or unwound.

What is claimed is:

1. A cassette for a record carrier in the form of a tape, comprising two rotatable winding reels for taking up and unwinding the record carrier; a brake lever for each of the winding reels, movable between a disengaged position, in which the brake lever is disengaged from the associated winding reel, and a braking position, in which the brake lever cooperates with the associated winding reel so as to brake said reel, the brake lever rotating the associated winding reel in a winding direction through a limited angle; and resilient means for moving each brake lever from its disengaged position to its braking position, comprising in addition a lever mount for the two brake levers, means for mounting the lever mount for movement between a rest position and an operating position, and means for moving the mount actuable from outside the cassette, the two brake levers being each journalled on said mount so as to be pivotable between their braking positions and their disengaged positions, and at least one control surface in the cassette for the brake levers, arranged such that during the movement of the lever mount from its rest position to its operating position, said surface cooperates with said brake levers to pivot said levers to their disengaged positions.

2. A cassette as claimed in claim 1, wherein said control surface includes a stop for each brake lever, which the brake lever engages when the lever mount is moved from its rest position to its operating position.

3. A cassette as claimed in claim 2, wherein said stop is formed by a portion of a wall of the cassette.

4. A cassette as claimed in claim 1, 2 or 3, comprising in addition at least one actuating spring arranged to urge the lever mount toward its rest position.

5. A cassette as claimed in claim 4, wherein said resilient means and said at least one actuating spring are formed by a plurality of arms of a unitary multi-arm leaf spring mounted in the cassette.

* * * * *